2,976,154
WHIPPED PEANUT PRODUCT AND METHOD FOR PRODUCING SAME

Leo C. Brown and Daniel Rusin, Chicago, Ill., assignors to Swift & Company, Chicago, Ill., a corporation of Illinois No Drawing. Filed May 29, 1959, Ser. No. 816,709

11 Claims. (Cl. 99—128)

The present invention relates to an improved whipped or foamed peanut product containing a predetermined amount of air or inert gas, such as nitrogen, and to an improved method for preparing the product.

Specific formulations and various methods have previously been proposed for producing a whipped peanut butter, but for a variety of reasons these products and methods have not been entirely satisfactory. In general, these prior methods have been incapable of incorporating large amounts of inert gas in the product without impairing the spreadability, palatability and/or appearance of the product. In addition, the prior products were difficult to pack in containers due to the presence of voids caused by the irregularity in size of the bubbles of entrained gas.

It is therefore a principal object of this invention to provide a method for preparing an improved whipped peanut product which will be easily spreadable and of creamy foamed consistency and will contain large quantities of an inert gas.

A further object of this invention is the production of a whipped peanut product of ideal taste and spreadability which possesses a smooth creamy texture and a stable foam structure.

Still another object of this invention is the preparation of a whipped peanut product having large quantities of an inert gas admixed therewith and possessing uniformity of appearance and improved spreadability.

An additional object is to prepare a whipped peanut product which has a stable foam structure and can easily be packed in glass jars or other suitable containers at uniform levels.

Another object of our invention is to provide an easy method for producing a superior whipped peanut product which contains greater quantities of inert gas than is possible with present methods.

A further object of our invention is to provide a method for producing a light and fluffy whipped peanut product of improved palatability and stable foam structure. The product virtually "melts in the mouth" and does not have the tendency to be sticky when eaten.

Still another object is to provide a method for incorporating large volumes of inert gas into a peanut butter mixture without the necessity for a premixing and cooling operation prior to gas incorporation.

A still further object is to provide a method for producing an improved whipped peanut product that will resist rancidity, will not oil out, and will not lose entrained gas from the foamed structure of the product.

Further objects and advantages of our invention will become apparent to those skilled in the art from the following description of the invention.

Whereas prior methods have not been capable of whipping large volumes of inert gas into peanut butter without producing a product having a ragged look with gas bubbles of widely varying size and a generally poor appearance and spreadability, our method produces a foamed product of good spreadability and palatability and having a uniformly smooth and creamy texture. We have discovered that this desirable product can be produced by subjecting a peanut butter mixture to a continuous flow process wherein substantial quantities of an inert gas, such as nitrogen, are incorporated into the mixture at relatively high temperatures, e.g., substantially above 100° F. and preferably within the range of 140–165° F. The hot mixture with the gas entrapped therein is then concurrently whipped and chilled to a temperature of about 70° F. or less and preferably within the range of 50–70° F.

The peanut butter mixture to be subjected to the process of our invention may vary as to formulation but will usually contain ground peanuts, hard fat such as hydrogenated peanut oil, salt, and a sweetening agent. It may also contain other flavoring material. We have found that, if a small amount of gelatin is mixed with the above ingredients, the resultant whipped product will be stabilized against loss of entrapped air or other inert gas. It does not appear that the gelatin promotes incorporation of inert gas, but product containing gelatin retains the gas with a more stable structure and, in addition, produces a drier and improved appearance. The effective amount of gelatin may vary with the particular formulation used, the amount of inert gas incorporated, etc. We have found that 0.1% gelatin by weight of the peanut mixture is an effective amount to stabilize the foam structure of the product so that it retains a uniformly whipped appearance that is creamy smooth and does not contain unsightly voids or possess a ragged look. A convenient method for incorporating 0.1% gelatin is by adding about 0.5% by weight of a 20% aqueous solution of gelatin to the peanut mix. Amounts as small as .01% gelatin by weight of the peanut mixture (0.05% gelatin solution) can be used with good structure stabilizing results. Greater quantities such as 0.1% and up to about 0.5% gelatin by weight of the peanut mixture can be used but are not required to produce the desired results.

The amount of hydrogenated peanut oil or hard fat used in the formulation of the peanut butter mixture can vary between about 1.5% and 10% by weight depending on the hardness of the fat. Below about 1.5% the product is difficult to whip and above about 10% the palatability of the product may be impaired. The range of hardness of the hard fats varies from about 40° C. titer to fully saturated, or about 63.5° C. titer. The proper amount to use is that amount which will effectively stabilize the product against oil separation and such amount are well understood by those skilled in the peanut butter making art. Other hard fats such as hydrogenated cottonseed oil, soybean oil, corn oil, lard and tallow, as well as the monoglycerides, diglycerides and polyglycerol esters of these hard fats and mixtures of the above may also be used, again in the amounts necessary to prevent oil separation of the product as understood by those skilled in the art.

The ingredients of the peanut butter mixture are then blended and preferably ground fine as by passing through one or more grinding mills. If desired, the mixture can be passed through a deaerator to remove all traces of air. This operation is not essential but leads to production of a superior product with respect to avoiding oxidation.

The temperature of the peanut butter mixture after formulating, blending, grinding and deaerating (if this is done) is substantially above 100° F. and will probably be about 150° F.

The peanut butter mixture is now ready for the whipping and chilling process which is carried out simultaneously. We feed an inert gas, usually nitrogen, into the hot mixture at a predetermined rate such that the resultant whipped product will contain from about 12 to about 42% entrapped nitrogen. Other inert gases may be used. Generally speaking, they should be nontoxic, should preferably have a low solubility in oil, and be substantially nonoxidizing. We have found that carbon dioxide does not produce as satisfactory a product as one containing nitrogen. Due to its relatively higher solubility in oil, very large quantities of the gas are required and, upon removing pressure from the product after filling into containers, the gas will greatly expand the product; nevertheless, it is feasible to use carbon dioxide as the whipping gas. Examples of other inert gases are argon, helium and xenon. Another gas which would be suitable for this purpose would be nitrous oxide or mixtures of the inert gases mentioned and nitrous oxide. Incorporation of inert gas in these quantities will reduce the specific gravity of the product from about 1 and usually about 1.135 to as low as .66 and insure a light and fluffy final product.

The gas is incorporated into the peanut butter through the use of higher gas pressure than exists on the peanut butter mixture. In order to accomplish this we prefer to use a vacuum on the peanut butter and allow the gas to flow into the peanut butter from a low pressure source rather than to force the gas from a high pressure source, since going from a comparatively low pressure to vacuum allows better control of the gas feed. However, a system whereby the gas is injected under a positive pressure higher than the pressure maintained on the peanut butter can be made to work satisfactorily providing subsequent whipping and chilling is concurrent and the whipping temperature is within 50–70° F.

In our preferred method we draw a vacuum on the mixture and feed nitrogen into the mixture while it is in the vacuumized zone. To do this we pass the hot peanut butter slurry through two feed pumps in series and subsequently into a mixing and chilling zone. The first pump is set to pass product through it at a predetermined rate, e.g., about 160 gallons per hour (or about 1500 pounds per hour). The second pump operates at a faster speed thereby creating a vacuum on the product in the line between the pumps. A needle valve is set to feed gas from a source thereof into the line in the vacuumized zone at such a rate (which may be measured by a rotameter) that a vacuum gauge on the section between the pumps is held at, for example, 15–18 inches vacuum. As an illustration a gas flow rate of about 15 cubic feet per hour will insure incorporation of about 40 to 42% by volume of gas in the final product when the first pump is set at a flow rate of about 160 gallons per hour. The flow rate of the first pump, the speed of the second pump, the amount of vacuum desired to be maintained on the section of the feed line between the two pumps, as well as the amount of nitrogen desired to be incorporated, will therefore dictate the "predetermined rate" of the gas feed.

The following table shows the specific gravities of the products formed upon whipping various amounts of nitrogen into the product.

Table

| Cubic Feet Peanut Butter Mix Per Hour | Cubic Feet Nitrogen Per Hour | Cubic Feet Whipped Peanut Butter Per Hr. | Percent Nitrogen | Specific Gravity |
|---|---|---|---|---|
| 21 | 0 |  | 0 | 1.135 |
| 21 | 3 | 24 | 12.5 | 1.00 |
| 21 | 4 | 25 | 16.0 | .95 |
| 21 | 5 | 26 | 19.0 | .91 |
| 21 | 6 | 27 | 22.0 | .875 |
| 21 | 7 | 28 | 25.0 | .85 |
| 21 | 8 | 29 | 28.0 | .82 |
| 21 | 9 | 30 | 30.0 | .795 |
| 21 | 10 | 31 | 32.0 | .77 |
| 21 | 11 | 32 | 34.0 | .75 |
| 21 | 12 | 33 | 36.0 | .73 |
| 21 | 13 | 34 | 38.0 | .70 |
| 21 | 14 | 35 | 40.0 | .68 |
| 21 | 15 | 36 | 41.5 | .665 |

The peanut butter mixture with the gas entrapped therein is then passed into a mixing zone where the product is whipped and the temperature is rapidly lowered to about 70° F. or less. The machine we preferably use for the concurrent mixing and chilling is a conventional Cherry-Burrell Model 300 continuous ice cream freezer capable of operating at low temperatures and adapted to whip large amounts of gas into a liquid. The unit is controlled so that the temperature of the product extruded from the discharge port is at about 70° F. or less and not substantially lower than 50° F. We have found that if the product temperature is much below about 50° F. when extruded it is too viscous. Above about 70° F. the product is darker in color than desired, less pleasing in appearance and is capable of less nitrogen retention. There is an extrusion valve on the discharge end of the unit which may be set so that the mixing zone is operated at a predetermined pressure. We have found that maintaining a pressure on the product in the mixing zone of about 40–100 p.s.i. and preferably 80±5 p.s.i. gives optimum results. Generally speaking, the time required from entrance of the mixture into the mixing zone until extrusion of the whipped product at the lower temperature will be from about five to six minutes.

While we prefer to use the above machine, we have found that our invention can also be carried out by the use of a conventional Votator peanut butter chilling machine. This machine is similar to the conventional ice cream freezer with the exception that the coolant is cold water either as such or diluted with various alcohols or salts in order that a lower temperature may be utilized and with the exception that the agitator operating within the cooling cylinder is designed primarily to remove cooled product from the cooling surface rather than to exert a whipping action. The addition of gas to this machine is carried out by injecting it into the peanut butter mix in a high pressure zone within the range of 30–80 p.s.i. Obviously the source of nitrogen must be at a higher pressure in order to obtain flow into the whipping zone.

We have found that flow rates through this type of Votator are considerably less, with the production of about 500–700 pounds per hour of whipped peanut butter, and the gas rates are controlled by metering valves capable of operating under the required pressures. In order for the peanut butter to absorb up to 42% nitrogen temperatures must be reduced to the same range as described above with the continuous ice cream freezer and whipping and chilling must be carried on simultaneously. Under these conditions, product can be made as satisfactorily with the Votator unit as can be made with the Cherry-Burrell unit.

As previously mentioned herein, conventional peanut butter formulations include minor amounts of salt and a sugar as flavoring materials. In addition, and among other flavor variations, we have found that the addition of malted milk produces a peanut product having an added taste appeal. For example, this effect can be achieved by adding about 10–15% by weight of malted milk flakes to the chilled and whipped peanut product. Additional materials, for example chocolate and/or coffee flavoring, candy bits, fruit, cracked nut bits of various types, etc., could be incorporated in the product in the same fashion.

The following examples illustrate the principles of our improved method and product and are not to be construed as imposing any limitations upon the scope of the invention apart from those set out in the appended claims.

*Example I*

Ground peanuts, a sweetening agent, salt and 5% peanut hard fat were finely ground and fed continuously to the whipping and chilling unit at the rate of about 1500 pounds per hour and a temperature of 145° F. Nitrogen was metered into the feed line at the rate of approximately 15 cubic feet per hour. The whipping and chilling unit was maintained at a back pressure of about 100 p.s.i. The foamed peanut product was discharged at 55° F. and filled into suitable containers. The resulting specific gravity was .665, or 41.5% nitrogen by volume. The product had a uniformly smooth creamy consistency and good spreadability.

*Example II*

Ground peanuts with a sweetening agent, salt and 2% hard fat were finely ground and fed continuously at a temperature of 145° F. to the chilling and whipping unit at a rate of 1500 pounds per hour. Four cubic feet per hour of nitrogen was metered into the feed line and the whipping and chilling unit was maintained at a back pressure of 50 p.s.i. The product was discharged at 70° F. and filled into containers. The resulting specific gravity was .95, the equivalent of 16% nitrogen by volume. The product had a stable foam structure and a smooth creamy consistency.

*Example III*

Ground peanuts with a sweetening agent, salt and 3% hard fat were finely ground and fed continuously to the whipping and chilling unit at a rate of 1500 pounds per hour and a temperature of 160° F. Nitrogen was metered into the feed line at the rate of about 7 cubic feet per hour. The whipping and chilling unit was maintained at a back pressure of 60 p.s.i. Product was discharged at 62° F. and it was found that the specific gravity was .85 or the equivalent of 25% nitrogen by volume. The product had a uniformly smooth and creamy appearance without the presence of large voids. The spreadability and palatability were good.

Malted milk chips were mixed with the whipped butter of this example at a 12% level and the product filled into containers.

*Example IV*

A peanut butter mixture was prepared containing ground peanuts, a sugar, salt and 2½% of a mono- and diglyceride prepared from 62° C. titer hydrogenated peanut oil with a monoglyceride content of about 40%. The mixture was ground and fed into a whipping and chilling unit at a temperature of about 150° F. and a rate of about 1500 pounds per hour. Prior to entering into the whipping and chilling portion of the unit, nitrogen gas was metered into the line at the rate of 10 cubic feet per hour. The unit was held at a back pressure of 80 p.s.i. The product discharged from the unit at a temperature of 64° F. and was filled into suitable containers. It possessed a specific gravity of .77. This is the equivalent of 32% nitrogen by volume. The product was of excellent appearance with uniform texture and exhibited no oil separation.

*Example V*

An admixture of finely ground peanuts, salt, a sweetening agent and 8% of a 45° C. titer cottonseed hard fat was prepared. The product had a temperature of about 145° F. and was pumped at this temperature into a conventional Votator peanut butter chilling unit maintained at a pressure of 70 p.s.i. The mixture was pumped into the unit at about 550 pounds per hour. Nitrogen under pressure of 100 p.s.i. was metered into the feed line of the unit at the rate of 7 cubic feet per hour. The unit was operated so that the product was agitated and the temperature simultaneously rapidly lowered to 68° F. The product from the unit was filled into containers and found to have a specific gravity of .85 (25% nitrogen by volume). The product had a good appearance and did not contain large voids. The spreadability was good.

Obviously many modifications and variations of the invention as hereinbefore set forth may be made without departing from the spirit and scope thereof and therefore only such limitations should be imposed as are indicated in the appended claims.

We claim:

1. The method of preparing a whipped peanut product comprising: feeding an inert gas into a peanut butter mixture having a temperature substantially above 100° F., and concurrently whipping said gas-entrained mixture and lowering the temperature thereof to about 70° F. or less.

2. The method of preparing a whipped peanut product comprising: incorporating an inert gas in a peanut butter mixture having a temperature substantially above 100° F., passing said gas-peanut butter mixture at about said temperature into a mixing and chilling zone operating at a predetermined pressure, simultaneously whipping and chilling said gas-peanut butter mixture in said zone to a temperature of about 70° F. or less, and extruding the product so formed.

3. The method of preparing a whipped peanut product comprising: incorporating an inert gas in a peanut butter mixture at a predetermined rate such that the resultant whipped product will contain from about 12 to about 42% by volume of entrapped gas; passing said gas-peanut butter mixture into a mixing and chilling zone operating at a predetermined pressure wherein the product is concurrently whipped and chilled, the temperature of said product being substantially above 100° F. upon entering said zone and about 70° F. or less upon leaving said zone; and extruding the product from said zone.

4. The method of preparing a whipped peanut product comprising: maintaining a peanut butter mixture at a predetermined first pressure, incorporating an inert gas in said mixture, said gas being maintained at a pressure greater than said first pressure, and concurrently whipping said gas-entrained mixture and lowering the temperature thereof from substantially above 100° F. to about 70° F. or less.

5. The method of claim 4 wherein the first pressure is less than atmospheric pressure and the inert gas is nitrogen.

6. The method of preparing a whipped peanut product comprising: maintaining a peanut butter mixutre having a temperature substantially above 100° F. at a predetermined first pressure, incorporating nitrogen in said mixture at said temperature and at a predetermined rate such that the resultant whipped product will contain from about 12 to about 42% by volume of entrapped nitrogen, said nitrogen being maintained at a pressure greater than said first pressure, passing said nitrogen-peanut butter mixture at about said temperature into a mixing and chilling zone operating at a predetermined pressure, simultaneously whipping and chilling said nitrogen-peanut butter mixture in said zone to a temperature of about 70° F. or less, and extruding the product so formed.

7. The method of preparing a whipped peanut product comprising: preparing a peanut butter mixture having a temperature between about 140-165° F., drawing a vacuum on said mixture, incorporating nitrogen in said vacuumized mixture at a predetermined rate such that the resultant product will contain about 12-42% by volume of entrapped nitrogen, passing said mixture and entrapped nitrogen at about said temperature into a mixing and chilling zone regulated to maintain a pressure of 40-100 p.s.i. on the product therein, concurrently whipping and chilling the product to a temperature between about 50-70° F., and extruding the resultant foamed product from said zone.

8. An improved whipped peanut product characterized by good spreadability and palatability, smoothness, creaminess, stability of foam structure, and consisting essentially of ground peanuts, hard fat, salt, flavoring material, and containing about 20-42% by volume of an inert gas.

9. An improved whipped peanut product characterized by good spreadability and palatability, smoothness, creaminess, stability of foam structure, and consisting essentially of ground peanuts, about 1½-10% by weight of a hard fat, salt, a sweetening agent, at least about .05% by weight of a 20% aqueous gelatin solution, and containing about 20-42% by volume of nitrogen.

10. The product of claim 8 wherein the flavoring material is selected from the group consisting of a sugar, a chemical sweetener, malted milk, chocolate, coffee, candy bits, fruit, cracked nuts and mixtures thereof.

11. The product of claim 8 wherein the flavoring material comprises malted milk and the inert gas is nitrogen.

References Cited in the file of this patent

UNITED STATES PATENTS

| | | |
|---|---|---|
| 1,696,766 | Howe | Dec. 25, 1928 |
| 2,357,896 | Howe | Sept. 12, 1944 |
| 2,834,682 | Zuckerman | May 13, 1958 |

UNITED STATES PATENT OFFICE
CERTIFICATION OF CORRECTION

Patent No. 2,976,154

March 21, 1961

Leo C. Brown et al.

It is hereby certified that error appears in the above numbered patent requiring correction and that the said Letters Patent should read as corrected below.

Column 3, line 32, for "about" read -- above --.

Signed and sealed this 8th day of August 1961.

(SEAL)
Attest:

ERNEST W. SWIDER
Attesting Officer

DAVID L. LADD
Commissioner of Patents